Dec. 6, 1960 P. D. BOLTON 2,963,245
OPTIMUM FLIGHT EQUILIBRIUM SYSTEM
Filed Jan. 29, 1958 3 Sheets-Sheet 1
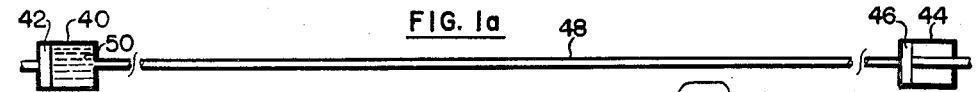
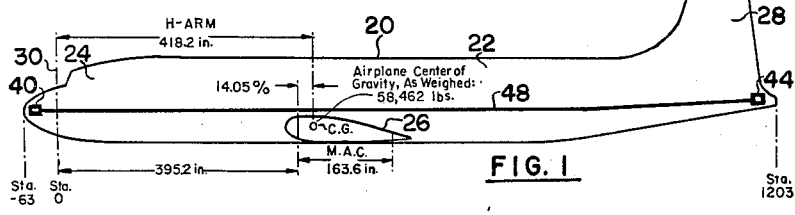
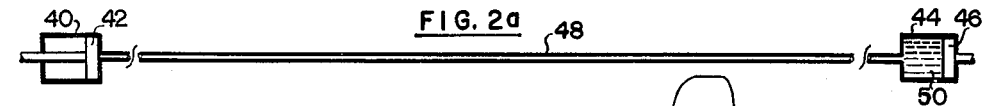
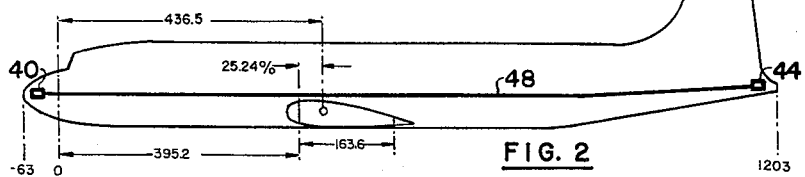
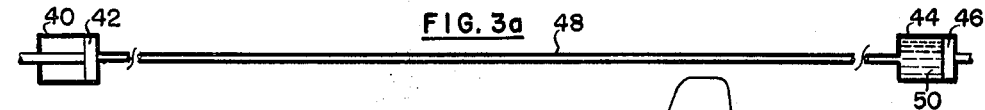
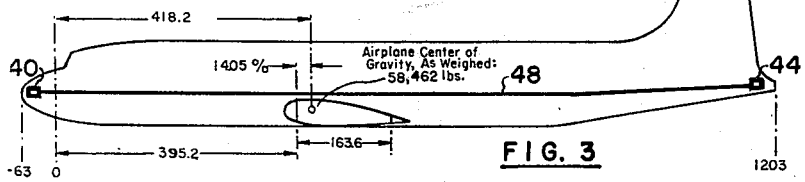
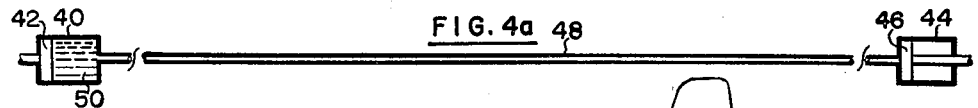
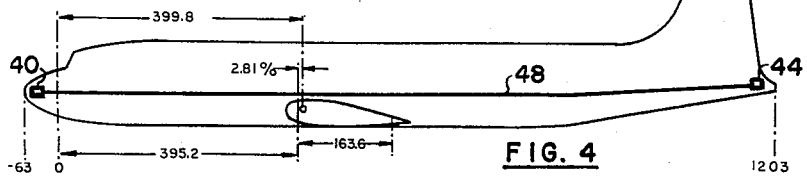
INVENTOR.
PAUL D. BOLTON
BY *Fulwider, Mattingly and Huntley* ATTORNEYS Dec. 6, 1960 P. D. BOLTON 2,963,245
OPTIMUM FLIGHT EQUILIBRIUM SYSTEM
Filed Jan. 29, 1958 3 Sheets-Sheet 2
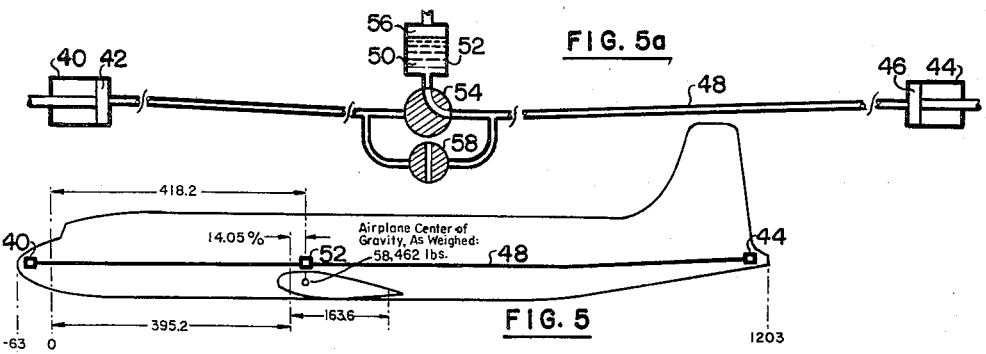
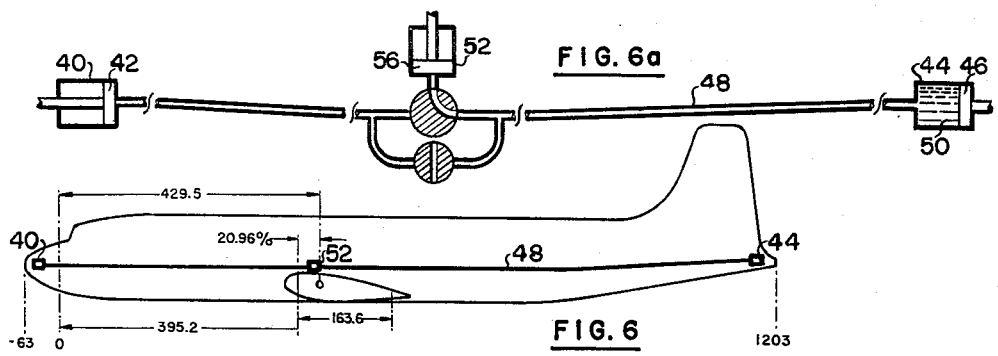
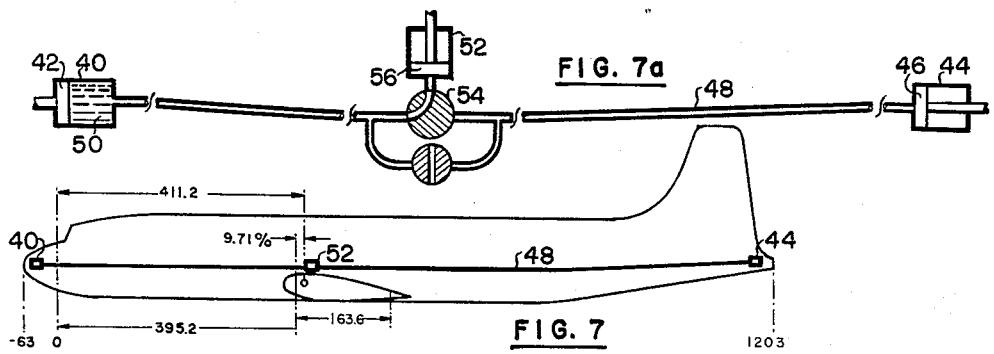
INVENTOR.
PAUL D. BOLTON
BY *Fulwider, Mattingly*
*and Huntley* ATTORNEYS Dec. 6, 1960  P. D. BOLTON  2,963,245
OPTIMUM FLIGHT EQUILIBRIUM SYSTEM
Filed Jan. 29, 1958  3 Sheets-Sheet 3
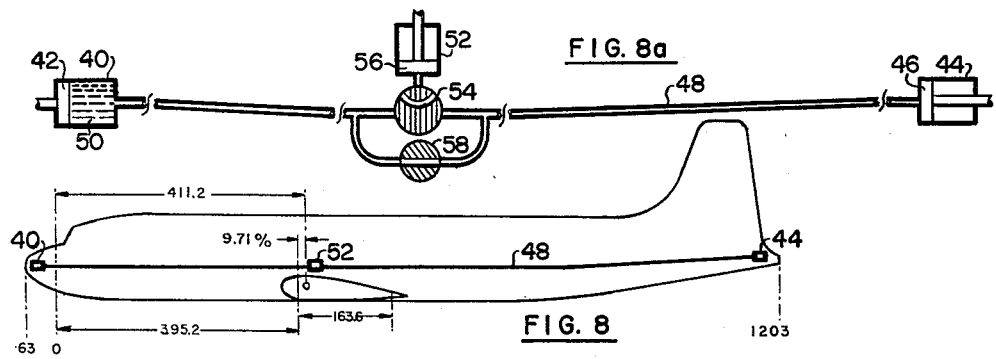
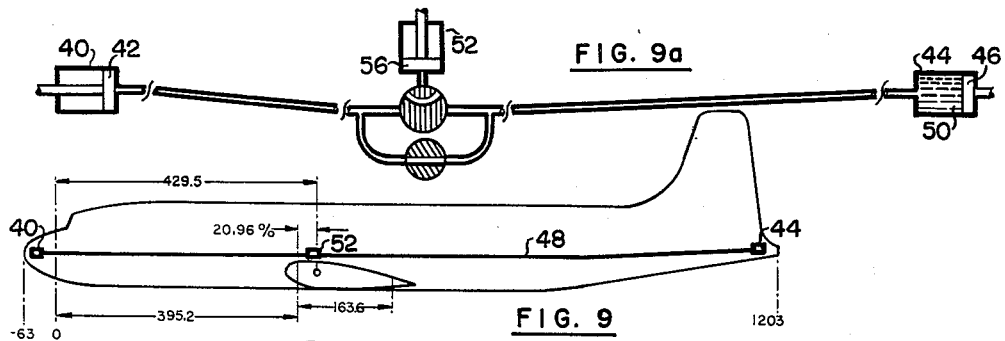
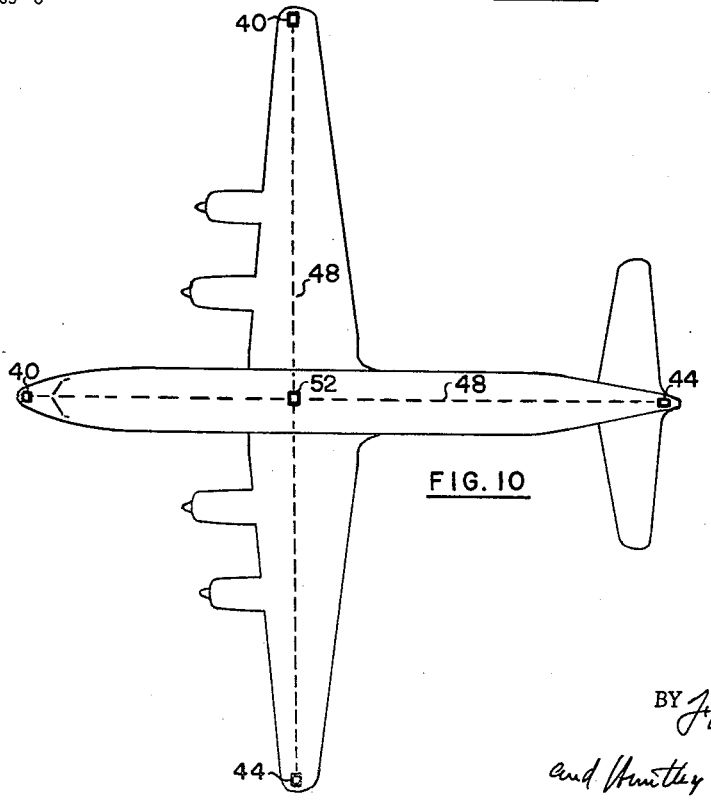
INVENTOR.
PAUL D. BOLTON
BY
ATTORNEYS

United States Patent Office 2,963,245
Patented Dec. 6, 1960

2,963,245

OPTIMUM FLIGHT EQUILIBRIUM SYSTEM

Paul D. Bolton, 3862 Martha St., San Diego 17, Calif.

Filed Jan. 29, 1958, Ser. No. 711,849

3 Claims. (Cl. 244—93)

The present invention relates to craft that are moved through or on fluids such as air or water and particularly to craft in which it is necessary to maintain the center of gravity within confined limits.

In one aspect, the present invention contemplates a craft which is adapted to move through a fluid such as water or air or which floats on the water, and which includes a mass of fluid such as mercury which is arranged to be shifted in a conduit system so that the center of gravity of the craft can be maintained or shifted if desired.

In aircraft, the craft is designed with a mean aerodynamic chord and the center of gravity of the craft should fall within this chord. Serious detrimental results follow the shifting of the center of gravity beyond the confines of this chord. Such shifting often follows the consumption of fuel, the careless loading of freight within the craft, or the disposing of bombs, torpedoes, missiles, etc. In practicing the present invention, I provide for shifting of a heavy substance, such as mercury, through a conduit system which lies longitudinally of the line or lines in which the load varies.

In the preferred embodiments of the present invention, I provide reservoirs on opposite sides of the mean aerodynamic chord, and thereby provide for greatly increasing the weight at the ends of the conduit system.

Further objects and advantages will be apparent from the following description, reference being had to the accompanying drawings wherein preferred embodiments of the invention are illustrated.

In the drawings:

Fig. 1 is a diagrammatic side view of an airplane showing principally the fuselage, the wings and the vertical stabilizer. More specifically it is a diagrammatic view of a DC–6B airplane manufactured by Douglas Aircraft Company of Santa Monica, California; in this figure, the length of the mean aerodynamic chord is shown as falling within the width of the wing and in the particular design starting 395.2 inches from the reference datum line and ending in a length of 163.6 inches, and the center of gravity is indicated by "O";

Fig. 1a shows the fluid system with the fluid in the position giving the results of the data found in Fig. 1;

Fig. 2 is a view similar to Fig. 1 but showing the center of gravity shifted rearwardly and also showing the mercury as being shifted rearwardly with respect to Fig. 2a;

Fig. 3 is a view similar to Fig. 1 and showing the center of gravity at the same place as Fig. 1;

Fig. 3a is the same as Fig. 2a which is the desired position of the mercury under certain conditions;

Fig. 4 is a view similar to Fig. 1 but showing the center of gravity shifted forward;

Fig. 4a is the same as Fig. 1 showing the result of a condition in which the mercury is shifted forwardly.

Fig. 5 shows another aspect of the invention in which a third reservoir is employed preferably adjacent the center of gravity of the airplane.

Fig. 5a is a diagrammatic view of the fluid system employing the three reservoirs and showing the valves for controlling the same.

Figs. 6, 6a, 7, 7a, 8, 8a, 9 and 9a are diagrammatic views similar to Figs. 5 and 5a respectively but showing various operating positions of the fluid transfer system; and Fig. 10 is a top plan view similar to Figs. 1 and 5, but showing the present invention as also being applied for shifting the mercury laterally of the fuselage, i.e., across the full length of the wings of the airplane.

The present invention contemplates not only the use of the present invention in combination with an aircraft, but also in combination with such craft as submarines, water-buoyed ships, as well as aircraft, and the term aircraft should also comprehend guided or unguided missiles. Referring more in detail to the drawings, I have illustrated only one form of craft, namely that of an airplane generally indicated at 20, which includes the fuselage 22 including the forward cabin section 24, the wings 26 and the vertical stabilizer 28. In the particular type of airplane illustrated, and more specifically referred to as the DC–6B, the standard reference datum line is indicated at 30 and the mean aerodynamic chord falls 395.2 inches rearwardly of datum line 30 and extends rearwardly another 163.6 inches. This particular airplane weighs 58,462 pounds fully equipped, but without freight, fuel, passengers, etc. In this instance the H-arm extends rearwardly 418 inches from the datum line 30 and the center of gravity lies in a vertical plane intersecting this 418 inches. At this time the mercury is in the position shown in Fig. 1a. For reasons of simplicity I have shown the conduit system as comprising a reservoir 40 in the form of a cylinder, which cylinder also houses a plunger 42. It also includes a second cylinder 44 which houses a plunger 46. These two cylinders are in open communication through a conduit 48. It will be readily observed that if the plungers 42 or 46 are moved to the right, the mercury 50 will be shifted from cylinder 40 through the conduit 48 to the cylinder 44. It will be understood that the system will be filled with mercury, and therefore the cylinders will be moved concomitantly by mechanically actuating either one or both.

It is desirable to maintain the center of gravity at a fixed position throughout the entire operation of the airplane. The center of gravity, however, tends to shift by either the consumption of fuel, the movement of, for example, passengers in the airplane, or the release of bombs, torpedoes or missiles. When the center of gravity is shifted, for example as shown in Fig. 2, the plungers 42 can be moved to the left so as to effect the resultant of the inch pounds by the shifting of the mercury.

For illustrative purposes we will consider that each of the cylinders 40 and 44 is adapted to contain one cubic foot of mercury weighing 847.4 pounds. In Figs. 1 and 1a, the center of gravity is at "O" when the mercury is in the position shown in Fig. 1a. In Figs. 2 and 2a, I have illustrated the position of the center of gravity when all of the mercury is shifted from the front to the rear of the airplane. In Figs. 3 and 3a the airplane is so loaded that the center of gravity is indicated by "O" when all the mercury is contained in the rear cylinder. In Figs. 4 and 4a I have shown the same load condition of the airplane except that the 847.4 pounds was shifted forwardly to the front cylinder and showing that by so doing the center of gravity "O" is near its extreme forward position, which of course is not desirable, but the illustration is merely for the purpose of showing the effect of the movement of the mercury from one extreme end to the other.

In the embodiment shown in Figs. 5 to 9a inclusive I have shown an intermediate reservoir, preferably located adjacent the optimum center of gravity. The reservoir is shown at 52. It is of the same volume as reservoirs 40 or 44, or it can be larger. In this embodiment the flow of mercury from the intermediate cylinder 52 to either of the cylinders 40 or 44 is controlled by a valve 54. If need be, because of the peculiar loading of the airplane, that all of the mercury be shifted to cylinder 44, the valve will be moved to the position shown in Figs. 5a and 6a. Then the piston 56 will be moved downwardly to force the fluid from cylinder 52 to cylinder 54. Part only of the volume of cylinder 52 can be directed to cylinder 44. If, for example, the airplane load is shifted somewhat at a different terminal, it may be desired to remove part of the mercury from cylinder 44, or all of it, to the cylinder 52, which is readily done by forcing the piston 46 to the left. The shifting of the load may be such that it would be desirable to return all of the mercury from cylinder 44 to cylinder 52. The condition also may be such that it is desirable not only to remove all of the mercury from cylinder 44, but also to move the mercury to cylinder 40. This may be done by first moving all of the mercury from cylinder 44 to cylinder 52 and then shifting valve 54 so that the mercury can flow from cylinder 52 to cylinder 40, or, if it is known in advance that all of the mercury should be shifted from cylinder 44 to cylinder 40, a second valve 58 is provided which can be turned to such a position that there is free access between cylinders 44 and 40.

The various positions of the valves are illustrated in Figs. 5a, 6a, 7a, 8a and 9a.

In the embodiment shown in Fig. 10 I have also illustrated how the invention can be employed on an aircraft in which the load is not equally distributed laterally. Here, in the event that the load is not equally distributed laterally, the mercury can be shifted from the cylinder 52 to either cylinder 40 or 44, as the case may be. It will, of course, be understood that similar cylinders 40 and 44 are disposed fore and aft in this embodiment as in the embodiments previously described.

Figures 1, 2, 3, 4, 5, 6, 7, 8 and 9 each show a percentage figure indicating the position of the center of gravity to the mean aerodynamic chord with the measurement commencing at the leading edge of the mean aerodynamic chord and more specifically from that point 395.2 inches from the reference datum point rearwardly.

From the foregoing it is readily apparent that I have provided a simple means for maintaining the center of gravity well within the confines of the mean aerodynamic chord of the airplane, and in fact with practical regulation by the attendant, the optimum center of gravity can be maintained.

While the forms of embodiments herein shown and described constitute preferred forms, it is to be understood that other forms may be adopted falling within the scope of the claims that follow.

I claim:

1. A craft adapted to move through a fluid such as air or water comprising a body having a mean aerodynamic chord; a mass of liquid; a conduit system for said liquid extending beyond the end limits of said chord and including a reservoir within the chord and means for supplying liquid to those portions of said system beyond said end limits; and valve means for controlling the flow of liquid between said portions and said reservoir.

2. A craft as defined in claim 1 characterized in that the liquid is mercury.

3. An aircraft comprising an elongated body having a mean aerodynamic chord; a mercury system including a first reservoir substantially within the confines of said chord, conduits extending from opposite sides of said reservoir and disposed longitudinally of said elongated body, second and third reservoirs at the extreme ends of said conduits, means for shifting mercury from one to the other reservoirs, valve means for controlling the direction of flow of said mercury; conduits extending from opposite sides of said first reservoir and disposed at substantially right angles to the first-mentioned conduits, and fourth and fifth reservoirs at the extreme ends of the second mentioned conduits.

References Cited in the file of this patent

UNITED STATES PATENTS

| | | |
|---|---|---|
| 688,398 | Dodge | Dec. 10, 1901 |
| 1,266,029 | Lehman | May 14, 1918 |
| 2,807,428 | Wibault | Sept. 24, 1957 |